United States Patent [19]

McArthur

[11] Patent Number: 5,562,190
[45] Date of Patent: Oct. 8, 1996

[54] HYDRAULIC CLUTCH CONTROL SYSTEM WITH FLUID COUPLING PRE-HEAT CIRCUIT FOR RAPID RESPONSE AT LOW AMBIENT TEMPERATURES

[75] Inventor: Malcolm J. McArthur, Escondido, Calif.

[73] Assignee: Sundstrand Corporation, Rockford, Ill.

[21] Appl. No.: 481,013

[22] Filed: Jun. 7, 1995

[51] Int. Cl.$^6$ .............................. F16D 47/06; F16D 25/12
[52] U.S. Cl. ........................ 192/57; 192/48.3; 192/82 T; 192/85 AA
[58] Field of Search ........................... 192/3.32, 57, 82 T, 192/48.3, 3.21, 85 AA

[56]  References Cited

U.S. PATENT DOCUMENTS

| | | | |
|---|---|---|---|
| 2,630,893 | 3/1953 | Misch et al. | 192/82 T X |
| 2,676,682 | 4/1954 | King. | |
| 3,088,563 | 5/1963 | Petrie et al.. | |
| 3,247,936 | 4/1966 | Aschauer. | |
| 4,493,293 | 1/1985 | Paul et al. | 192/82 T X |

*Primary Examiner*—Rodney H. Bonck
*Attorney, Agent, or Firm*—Lawrence E. Crowe

[57] ABSTRACT

A power plant is provided which includes a drive apparatus actuated clutch which can be rapidly engaged to selectively connect a prime mover to a driven device after prolonged exposure of the power plant to cold ambient temperatures. The drive apparatus utilizes a fluid coupling connected, connected in parallel with the clutch for rapidly heating a control volume of fluid used for actuating the clutch. In a preferred embodiment, the fluid coupling also motors the drive mechanism at 5–10% of rated speed to help circulate fluid heated by the fluid coupling through the drive mechanism to thereby reduce start-torque and drag torque experienced by the clutch on start-up. The clutch thus may be made smaller with less risk of burn-out, while still being capable of rapidly engaging following prolonged exposure to cold ambient temperatures.

8 Claims, 1 Drawing Sheet

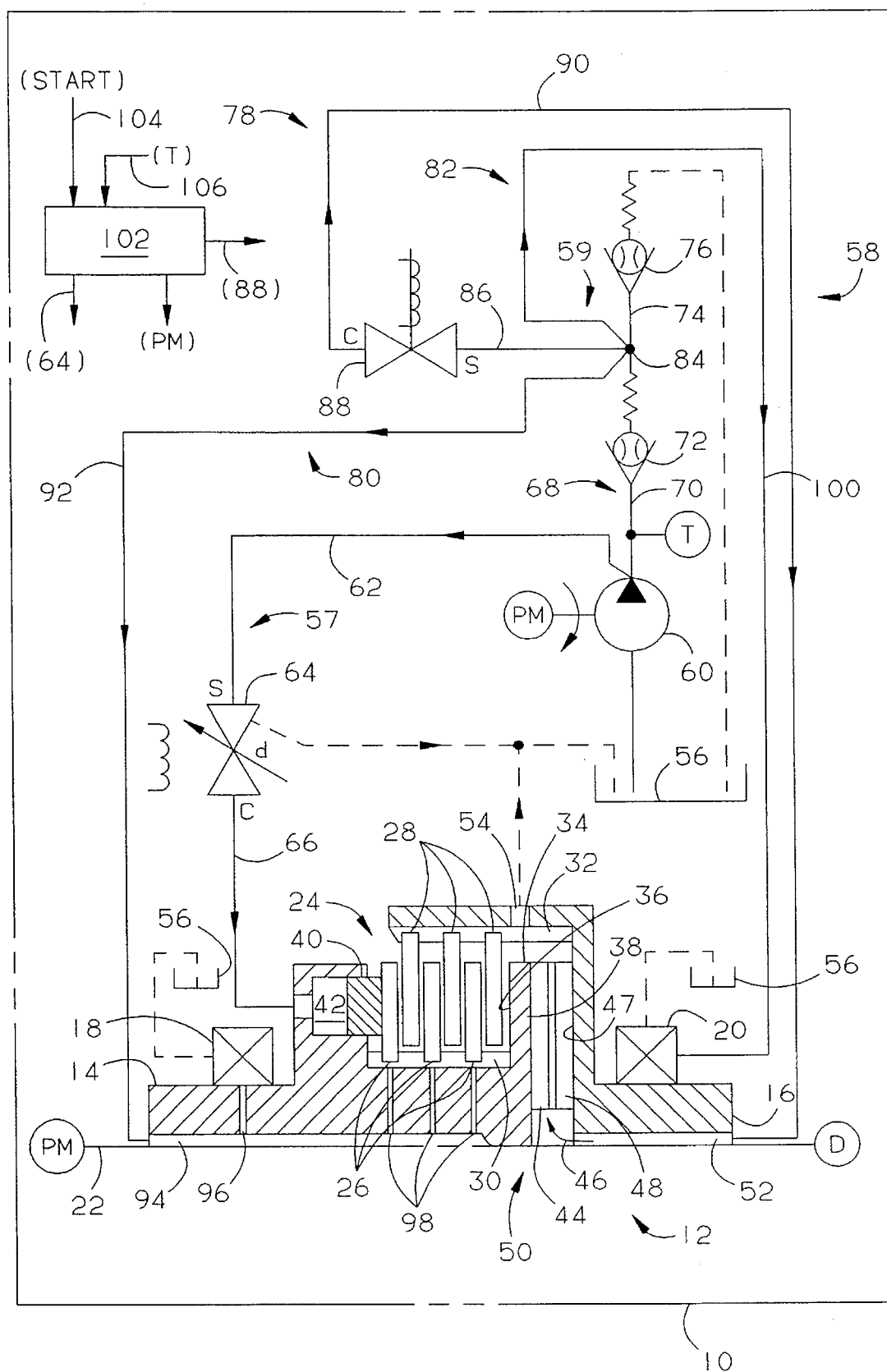

HYDRAULIC CLUTCH CONTROL SYSTEM WITH FLUID COUPLING PRE-HEAT CIRCUIT FOR RAPID RESPONSE AT LOW AMBIENT TEMPERATURES

TECHNICAL FIELD

This invention relates to hydraulic systems generally, and more particularly to apparatus including a hydraulic system which must provide rapid actuation and stable operation of a pressure actuated device such as a hydraulically actuated clutch at low temperatures.

BACKGROUND

Emergency power units which supply electrical or hydraulic power for critical flight control systems on an aircraft, following a loss of main engine power, must come on line and begin producing power virtually instantaneously when they are needed. The same is true for power transmission or generation apparatus used in stationary emergency power generators which supply electricity to a computer or a hospital, for instance, in the event of a power outage in a municipal power grid. These systems must provide power virtually instantaneously despite the fact that they may have been sitting idle for extended periods of time at ambient temperatures of −20° F. or below.

Such emergency power units often utilize a hydraulic clutch to couple an engine or other prime mover to a generator, a pump, a gearbox, or some other driven device. The clutch allows the driven device to be de-coupled from the engine during startup to reduce the load on the engine start system. The clutch also allows the engine to be rapidly decoupled from the driven device for safety or other reasons. In some instances the clutch is further required to provide a controlled amount of slip to achieve a smooth engagement, or to compensate for rapid fluctuations in the load imposed on the engine by the driven device.

A hydraulically actuated clutch, as well as the control system for engaging the clutch, must be properly designed to allow rapid engagement of the clutch after prolonged exposure to low ambient temperatures. In general, the clutch and control system must either include features that compensate for the increased viscosity of hydraulic fluids at low temperatures, or some means must be provided for heating the cold viscous fluid, to lower its viscosity, prior to engaging the clutch. If such compensation or heating features are not provided, unstable clutch operation of the clutch may occur during an attempt to engage the clutch at low temperatures.

In the past, a number of different approaches have been utilized to provide temperature compensation or pre-heating of the hydraulic fluid. Perhaps the simplest approach is to allow the hydraulic fluid to circulate within the control circuit and warm-up for some period of time prior to attempting an engagement of the clutch. The circulating fluid is heated by friction and dynamic pressure losses within the hydraulic circuit. While this approach has the advantage of being extremely simple to implement, since no additional compensation or heating devices are required, it can result in severe operating penalties due to the long periods of time involved to warm the fluid to an acceptable operating temperature.

Alternatively, various types of heating devices have been utilized to more rapidly raise the temperature of the fluid. In some prior applications, electrical resistance heaters, engine exhaust gas, or engine coolant circuits have been utilized to either maintain the fluid in a ready-state at operating temperature, or in an on-demand mode to rapidly heat the fluid to operating temperature following a command to engage the clutch. For preheating devices other than the "ready-state" type, some delay is still encountered, but the clutch can usually be engaged significantly faster than in prior applications relying solely on circulation of the fluid to cause heating by fluid resistance and dynamic pressure loss. In other prior clutch control systems, temperature compensating features are included in control valves, etc., to accommodate changes in fluid viscosity which could otherwise result in unstable operation at low temperatures.

In addition to dealing with control stability problems, some drive systems must also deal with high viscous drag torques, upon start-up at cold temperatures, in gearboxes or other driven devices connected to the output of the drive system. These viscous drag forces are the result of cold viscous lubricant in bearings, gears, seals, etc. of the driven device. In some prior drive systems where such high viscous drag is present, the clutch itself has been oversized to prevent burn-out. The addition of temperature compensation for achieving control stability and over-sizing the clutch, as described above, have obvious disadvantages of increasing system complexity, size, weight and cost.

In yet another prior approach, some drive systems utilize a fluid coupling operably joining the prime mover to a driven device in a parallel drive arrangement with the hydraulically actuated clutch. The fluid coupling is utilized to provide smoother engagement of the hydraulically actuated clutch over a range of operating temperatures and speeds. Specifically, during start-up at low temperatures the fluid coupling is engaged first, and drives the output speed up to approximately match input speed. The hydraulically actuated clutch is then engaged, and the fluid coupling is disengaged. The fluid coupling allows a limited amount of slip between the input and output speeds during start-up. This limited amount of slip compensates for the higher start torque at low temperatures caused by cold viscous fluid in the clutch control system, or in bearings, gears, etc., of the drive mechanism. By not requiring the hydraulically actuated clutch to engage until input and output speeds are approximately equal, the danger of burn-out of the hydraulically actuated clutch is significantly reduced, U.S. Pat. No. 3,247,936 to Aschauer and 3,088,563 to Petrie illustrate drive devices of this type.

It is generally highly desirable to design the fluid coupling portion of such devices to have a power transmitting efficiency that is as high as possible to minimize the amount of time it takes for the fluid coupling to bring the output speed up to a speed at which the hydraulically actuated mechanical drive portion of the clutch can be safely engaged. Any inefficiency in the fluid coupling is primarily converted into heating of the fluid. While this heating due to coupling inefficiency does serve to help the fluid to more rapidly warm up, it is generally considered to be a relatively insignificant or even an undesirable side-effect to the primary goal of providing a high efficiency fluid coupling to allow rapid engagement of the mechanical drive portion of the drive apparatus.

To achieve high power transmitting efficiency the fluid coupling portion of combined fluid/mechanical driven systems, great care must be taken in the design and manufacture of the fluid coupling portion of the drive system. Complex shapes and close tolerances may be required for components within the fluid coupling. The need for such complex shapes to achieve high efficiency drives up the cost, weight, and size of prior fluid coupling/mechanical drive couplings to the point that they have not been a practical solution to the problem of providing rapid engagement of a hydraulically actuated clutch at low temperatures in many compact, low cost power plants, such as those described above.

Accordingly, it is an object of my invention to provide an improved hydraulically actuated drive apparatus, suitable for use in a wide range of power plants, that is capable of rapidly engaging after prolonged exposure to low ambient temperatures. It is also an object of my invention to provide an improved hydraulic clutch, and a control system for that clutch which is capable of providing rapid actuation and stable control of the clutch after prolonged exposure to low ambient temperatures. Additional objects of my invention include providing:

1. a gas turbine engine powered auxiliary power unit (APU) capable of providing a controlled power output in less than 30 seconds after receiving a start command when the APU has been exposed for an extended period of time to ambient temperatures of −20° F.;
2. a hydraulic control system capable of engaging and providing stable control of a hydraulic clutch in less than 30 seconds after prolonged exposure to ambient temperatures of −20° F.;
3. an on-demand heating system which is applicable to hydraulic systems having either single or multiple branches and capable of heating at least a portion of the fluid in the system to a temperature at which a control circuit of the hydraulic system can engage and achieve stable control of a fluid actuated device, such as a hydraulic clutch, in less than 30 seconds after prolonged exposure to ambient temperatures of −20° F.; and
4. a straightforward and inexpensive arrangement for producing a hydraulic system meeting the above stated objects.

SUMMARY

My invention achieves the objects stated above in an apparatus having a prime mover that is selectively couplable through a drive mechanism to a driven device such as a pump, or an electrical generator. The drive mechanism of my invention utilizes a fluid coupling in a parallel drive arrangement with a hydraulically actuated clutch.

Unlike prior drive mechanisms having such a parallel drive arrangement, however, the fluid coupling of my drive mechanism is purposely designed to have a low power transmitting efficiency, and a high fluid heating capability. The primary function of the fluid coupling of my invention is to rapidly heat a small control volume of fluid in the clutch control circuit to a temperature at which the hydraulic clutch can be safely engaged without fear of burn-out and provide stable control.

In some embodiments of my invention, the fluid coupling is designed to transmit enough power to also drive the output at a fraction, i.e. about 5 to 10%, of a normal operating speed, in order to circulate and warm any fluid in the output portion of the drive mechanism. Such circulation and warming serves to reduce viscous drag in the output portion of the drive system. Driving the output portion of the drive means and any driven device attached thereto also provides an additional benefit of reducing viscous drag in the driven device, thereby reducing the necessity for oversizing the clutch to prevent clutch burn-out on start-up at cold ambient temperatures.

Specifically, my invention provides an apparatus having a prime mover that is selectively couplable through drive means including a hydraulically actuated clutch to a driven device, and a clutch control system for rapidly actuating the clutch. The clutch control system includes clutch actuator means operably connected to the clutch for selectively actuating the clutch to couple the prime mover to the driven device. The clutch actuator means define a control volume of fluid therein which is used for hydraulically actuating the clutch.

A fluid coupling within the drive means operably connects the prime mover to the driven device in a parallel drive arrangement with respect to the hydraulically actuated clutch. The fluid coupling and clutch are configured in such a manner that when the clutch is not engaged, to connect the prime mover to the driven device, the prime mover drives the fluid coupling.

The fluid coupling is further operably connected in fluid communication with the control volume of fluid of the clutch actuator means for providing a primary function of heating fluid in the control volume, to thereby provide rapid actuation of the clutch after exposure to cold temperatures. Any power transmission by the fluid coupling of my invention, for reducing viscous drag, in the output portion of the drive system and the driven devices attached thereto, is a secondary function in relation to the primary function of heating the fluid in the control volume.

Because the primary function of the fluid coupling of my invention is to produce heat in the control volume of fluid, rather than transmitting rotational power, the fluid coupling of my invention does not require the close tolerances and complex shapes of prior fluid couplings. Simple radially directed fins, or even judiciously placed structural ribs on adjacent surfaces of a driving and a driven element of hydraulically actuated clutch can provide a sufficient fluid coupling for utilization of my invention. Because the fluid coupling of my invention is of straightforward design, particularly in embodiments amenable to formation of the fluid coupling by relocation of existing structural ribs, etc., my invention can be readily incorporated at low cost into compact drive systems. My invention thus provides a straightforward means of heating the fluid utilized to actuate the hydraulic clutch without the need for resorting to the more complex approaches for heating, providing temperatures compensation, or providing a limited slip-fluid coupling, utilized in prior drive mechanisms as described above.

These and other aspects and advantages of my invention will be apparent to those skilled in the art upon consideration of the drawing figure and the following detailed description of exemplary embodiments.

BRIEF DESCRIPTION OF THE DRAWINGS

The drawing figure is a schematic representation of an apparatus according to my invention in the form of a power plant having a driven device, such as an electrical generator or a pump, selectively couplable through a hydraulic clutch to a prime mover such as an engine.

DETAILED DESCRIPTION OF PREFERRED EMBODIMENT

The drawing depicts an exemplary embodiment of my invention in the form of an apparatus 10, such as a power plant or an auxiliary power unit (APU) for an aircraft, having a prime mover PM in the form of an engine that is selectively couplable through drive means 12 to a driven element D in the form of an electrical generator or a pump. The drive means 12 includes an input shaft 14 operably connected to the prime mover PM, and an output shaft 16 operably connected to the driven device D. The input and output shafts 14, 16 are journaled respectively in bearings 18,20 for rotation about a common axis of rotation 22.

The input and output shafts 14, 16 are further configured respectively as the driving and driven elements of a hydraulically actuated clutch, generally designated 24. The clutch 24 includes a series of interleaved annular shaped drive plates 26 and driven plates 28. The drive plates 26 are attached to the input shaft 14 by a splined connection 30 in a manner to be slidable axially thereupon, but constrained to rotate with the input shaft 14. In a similar fashion, the driven plates 28 are attached to the output shaft 16 by a splined connection 32 to be slidable axially thereupon, but constrained to rotate with the output shaft 16. The right end of the input shaft 14, as depicted in the drawing, adjacent the output shaft 16 is configured as a radially extending integral flange 34 having a first face 36 adjacent the driving and driven plates 28,30, and a second face 38 adjacent the output shaft 16.

The input shaft 14 includes a clutch actuation piston 40 mounted for axially reciprocal motion within a cylinder 42. When pressurized hydraulic fluid is supplied to the cylinder 42, the piston 40 applies an axial force on the drive and driven plates 26,28, thereby sandwiching them tightly together between the piston 40 and the first face 36 of the flange 34 to engage the clutch 24 and allow power transmission through the clutch 24 from the prime mover PM to the driven device D. When pressure is released from the fluid in the cylinder 42, a return spring (not shown) forces the plates 26,28 apart to disengage the input shaft 14 from the output shaft 16.

The second face 38 of the axially extending flange 34 is configured to define ribs, blades, grooves or other fluid impeller means 44 extending axially therefrom into an annular shaped cavity 46 between the second face 38 of the flange 34 and a faying surface 47 of the output shaft 16. The faying surface 47 of the output shaft is similarly configured with ribs, blades, grooves or other turbine means 48 attached thereto. The fluid impeller and turbine means 44,48 form a fluid coupling 50 between the input and output shafts 14, 16 when fluid is supplied to the annular shaped cavity 46, and there is relative motion between the input and output shafts 14, 16. An internal passage 52 in the output shaft 16 is provided to supply fluid to the annular shaped cavity 46 between the input and output shafts 14, 16. An orifice 54 allows fluid in the annular cavity 46 to exit the fluid coupling 50 and drain into a common sump 56 of the drive means 12.

The drive means 12 further includes a hydraulic control and lubrication circuit generally indicated as 58. The hydraulic control and lubrication system 58 includes a single pump 60 driven by the prime mover PM and drawing fluid from the common sump 56. The pump 60 supplies pressurized fluid in a parallel flow circuit relationship to a clutch actuation circuit 57, and to a lubrication and heating circuit 59 of the hydraulic system 58.

The clutch actuation circuit 57 includes, in a sequential series flow relationship, conduit 62 extending from the pump 60 to a supply port 's' of a servo valve 64; the servo valve 64; and conduit 66 extending from a control port 'c' of the servo valve 64 to the cylinder 42. The control valve 64 also includes a drain port 'd' connected to the common sump 56.

The lubrication and heating circuit 59 includes a main branch 68 having in a sequential series flow relationship, the pump 60; conduit 70 extending from the pump 60 to a pressure reducing valve 72; conduit 74 extending from pressure reducing valve 72 to a low pressure relief valve 76 which dumps to the common sump 56. A fluid heating circuit 78, a first lubrication circuit 80, and a second lubrication circuit 82 all branch off from the main branch 68 of the lubrication and fluid heating circuit 59 at a junction 84 of conduit 74 between the pressure reducing valve 72 and the low pressure relief valve 76.

The fluid heating circuit 78 includes, in a sequential series flow relationship, conduit 86 connecting the junction 84 to a supply port s of a fluid control valve 88; the control valve 88; and conduit 90 connecting a control port 'c' of valve 88 to the internal passage 52 in the output shaft 16. The first lubrication circuit 80 includes, in a sequential series flow relationship, a conduit 92 connecting the junction 84 to an internal passage 94 in the input shaft 14; the internal passage 9,4; and orifices 96,98 which supply fluid to the input shaft bearing 18 and the clutch plates 26,28 for lubrication and cooling of the input shaft bearing 18 and the clutch 24. Fluid supplied to the bearing 18 and the clutch 24 by the first lubrication circuit 80 returns to the common sump 56 via passages in a clutch housing (not shown) and the orifice 54 in the output shaft 16. In similar fashion the second lubrication circuit 82 includes conduit 100 extending from the junction 84 to the output shaft bearing 20 for supplying lubricating and cooling fluid to the bearing 20. Fluid supplied to the output shaft bearing returns to the common sump 56 via coolant passages in the clutch housing (not shown).

As depicted in the Drawing, the elements of the hydraulic control and lubrication system 58 in combination form a clutch actuator means. Fluid within the hydraulic control and lubrication system 58 forms a control volume of fluid which may be circulated through the fluid heating circuit 78 by the pump 60 to be heated by the fluid coupling 50 prior to returning to the common sump 56.

A controller 102 provides control signals to the prime mover PM, the servo valve 64, and to the fluid control valve 88 in response to a command signal 104 from an external source (not shown) and a temperature signal 106 from a temperature sensor 'T', installed to sense fluid temperature in the main branch 68 just downstream from the pump 60.

OPERATION AT NORMAL TEMPERATURES

At normal operating temperatures of about 20° F. and above, the fluid heating circuit 78 and the fluid coupling 50 are not utilized. When a start signal 104 is received by the controller 102, it checks the temperature signal 106 from the temperature sensor 'T'. If the temperature is above a predetermined setpoint of about 20° F., the controller 102 sends signals to both the fluid control valve 88 and the servo valve 64 commanding them to close, thereby blocking fluid flow respectively through the fluid heating circuit 78, and the clutch actuation circuit 57. No fluid can thus flow to either the cylinder 42, for actuating the clutch, or to the fluid coupling 50, for heating.

The controller then sends a signal to the prime mover PM commanding the prime mover PM to start. The prime mover PM accelerates to operating speed, and simultaneously drives the pump 60 to circulate fluid in the first and second lubrication circuits 80,82 for lubricating the clutch 24 and bearings 18,20. When the prime mover PM has accelerated to approximately 100% of a predetermined operating speed, such as about 12,000 rpm for the exemplary embodiment, the controller 102 sends a signal to the servo valve 64 commanding it to open and supply pressurized fluid to the cylinder 42. The pressurized fluid in the cylinder 42 acts on the piston 40 to clamp the driving and driven plates 26,28 against the flange 34, thereby engaging the clutch 24, so that the prime mover PM can drive the driven device D. The controller 102 modulates the servo valve 64 to provide stable control of the clutch 24. Stopping the driven device D, and shutting down the prime mover PM are accomplished by essentially reversing the procedure described above.

The fluid heating circuit 78 and the fluid coupling 50 are thus not used at normal operating temperatures. At normal temperatures, the fluid is not highly viscous, and the clutch 24 can be safely and controllably engaged as soon as the prime mover PM has reached the predetermined operating speed. By keeping the control valve 88 closed, during normal temperature operation, no fluid is delivered to the annular cavity 46, and the fluid coupling 50 thus imposes no parasitic drag torque on the prime mover PM.

LOW TEMPERATURE OPERATION

At low temperatures, below about 20° F., the fluid in the control volume defined by the hydraulic system 58, and within the clutch 24 and bearings 18,20 will become viscous enough to potentially cause instability if a start is attempted without pre-heating the fluid. Also, unless the output portion of the drive means 12 and the driven device D are "motored" at about 5–10% of rated speed for reducing viscous drag prior to engagement of the clutch 24, clutch burn-out may occur. Under such conditions, when the controller 102 receives the start signal 104, it will check the temperature signal 106 from the temperature sensor 'T', and determine that because the temperature is below about 20° F., heating of the fluid is required prior to engaging the clutch 24. The controller 102 will first send a signal to the servo valve 64 commanding it to close and block fluid flow to the cylinder 42. The controller 102 will also send a signal to the fluid control valve 88 commanding it to close and block fluid flow through the fluid heating circuit 78 to the fluid coupling 50. The controller 102 will then send a signal to the prime mover PM commanding it to start.

As the prime mover accelerates toward operating speed it drives the pump 60. With the fluid control valve 88 and the servo valve 64 closed, the pump 60 will supply pressurized fluid from the common sump 56 to the bearings 18,20, via the first and second lubrication circuits 80,82. When the prime mover has accelerated to about 100% of operating speed, the controller 102 will send a signal to the control valve 88 commanding it to open and supply fluid to the fluid coupling 50 via the fluid heating circuit 78. The fluid coupling in a preferred embodiment of my invention is configured to transmit about 5–10% of the input power from the input shaft 14 to the output shaft 16 with the prime mover PM driving the input shaft at operating speed. This small amount of power transfer is utilized to "motor" the output shaft 24 at about 5–10% of operating speed. The remaining 90–95% of input power is converted to heating of the fluid, primarily by operation of the fluid coupling 50.

Because all fluid in the hydraulic control system 58 is drawn from and returns to the common sump 56, the fluid coupling 50 rapidly heats the control volume of fluid to a normal operating temperature of about 20° F. In a clutch of a typical aircraft mounted APU, for instance, the fluid temperature can be increased from −20° F. to 20 ° F. in about 20 seconds using my invention. Designing the fluid coupling to provide motoring at about 5 to 10% of operating speed promotes circulation of warmed fluid through the bearings 18,20 and the clutch 24. This circulation of warmed fluid reduces viscous drag in the drive means 12, thereby reducing start torque imposed on the clutch 24 at initial engagement. Motoring of the driven device D also serves to reduce viscous drag in any bearings, gears, etc., of the driven device D.

As the fluid in the control volume is heated by the fluid coupling 50, the controller 102 monitors the temperature signal 106 from the temperature sensor 'T'. When the fluid reaches operating temperature, (about 20° F. for the exemplary embodiment) the controller 102 sends a signal to the servo valve 64 commanding it to open and allow a flow of fluid into the cylinder 42 to engage the clutch 24. The controller then sends a signal to the fluid control valve 88 commanding it to close and cut off fluid flow to the fluid coupling 50. The controller 102 modulates the servo valve 64 to control engagement and provide stable operation of the clutch 24 in the same manner as described above for normal temperature operation. Disengagement of the clutch 24 and shut-down of the prime mover PM are also accomplished as described above for normal temperature operation. There will normally be no need to open the fluid control valve 88 following disengagement of the clutch 24 because the fluid in the control volume will already be at or above a minimum operating temperature.

It is contemplated that for a typical aircraft mounted APU, the entire process from receipt by the controller of the start signal 104 to full controlled engagement of the clutch can be accomplished in less than 30 seconds using my invention. Without the fluid heating and viscous drag reduction provided by my invention, that same aircraft APU would typically need to run in a fluid circulating mode for several minutes prior to engaging the clutch in order for the fluid to warm up to a temperature at which a controlled clutch engagement could safely be attempted without risk of burning out the clutch. Even then, an oversized clutch might be required to prevent clutch burn-out due to high viscous drag.

From the foregoing description, those skilled in the art will readily recognize that my invention overcomes problems encountered in prior apparatus requiring rapid actuation and stable control of a hydraulically actuated clutch at low ambient temperatures. Specifically, with the hydraulic system of my invention it is now possible to have an apparatus, such as an emergency power unit, on line within about 30 seconds of a start command, even where the power unit has been cold-soaked to low ambient temperatures such as −20° F. prior to attempting start up. My invention thus provides a convenient means for heating the fluid in a hydraulically operated clutch circuit so that rapid start up and stable operation may be achieved, and eliminates the need to let the hydraulic fluid circulate for unacceptable periods of time to warm up prior to attempting to engage the clutch.

Those skilled in the art will further recognize that, although I have described my invention herein with respect to several specific embodiments and applications thereof, many other embodiments and applications of our invention are possible within the scope of our invention as described in the appended claims. For example, a virtually infinite variety of other hydraulic control system circuit configurations can be utilized in practicing my invention. Specifically, in apparatus where the starting torque of the clutch is not a major factor, it may be desirable, as a result of design considerations, to separate the fluid heating circuit from the lubrication and clutch actuation circuits.

In other applications, it may be desirable to transmit more or less than about 5–10% of the power through the fluid coupling while the system is operating in the fluid heating mode. However, those skilled in the art will recognize that as the amount of power transferred by the fluid coupling is increased above the 5–10% required for motoring the output, the length of time to heat the fluid to an acceptable operating temperature will be lengthened. Conversely, if the amount of power transferred through the fluid coupling in the heating mode is reduced below about 5–10%, circulation of the warmed fluid through the output portion of the drive means will be correspondingly reduced, thus increasing the risk that viscous fluid in the output portion will increase starting torque when the clutch is engaged.

My invention can also be utilized to advantage in hydraulically actuated devices other than the interleaved plate type clutch illustrated in the exemplary embodiment. Although the exemplary embodiment utilized a servo type control valve 64 in other embodiments it may be preferable to utilize a simple on-off type valve to engage the clutch. It is understood, therefore, that the spirit and scope of the appended claims should not be limited to the specific embodiments described and depicted herein.

I claim:

1. In an apparatus having a prime mover that is selectively coupable through drive means including a hydraulically actuated clutch to a driv system for providing rapid actuation of the clutch, said clutch control system comprising:

a) clutch actuator means operably connected to said hydraulically actuate clutch for selectively actuating said clutch to couple said prime mover e of fluid therein, and b) fluid coupling means operably connected within said drive means between said prime mover and said driven device in a parallel drive arrangement to said hydraulically actuated clutch in such a manner that when said clutch is not engaged to connect said prime mover to said driven device said prime mover drives said fluid coupling;

said fluid coupling means being further operably connected in fluid communication with said control volume of fluid of said clutch actuator means for providing a primary function of heating fluid in said control volume, to thereby provide rapid actuation of said clutch after exposure to cold temperatures;

any power transmission by said fluid coupling being a secondary function in relation to said primary function of heating the fluid in said control volume.

2. The apparatus of claim 1 wherein a total power input to said drive means from said prime mover includes a larger heat producing portion consumed by said fluid coupling means, and a relatively smaller power transmission portion passing through said fluid coupling means to drive said driven device when said clutch is disengaged.

3. The apparatus of claim 2 wherein a ratio of said larger to said smaller portions of said power input is about at least 9 to 1.

4. The apparatus of claim 2 wherein said larger portion of said power input is about 51% of said power input.

5. The apparatus of claim 1 wherein said prime mover drives said driven device at a rated rotational speed when said clutch is engaged, and said fluid coupling means is configured to drive said drive means at a maximum of about 5 to 10 percent of said rated rotational speed when said prime mover is supplying power to said drive means at said rated rotational speed and said clutch is not engaged.

6. The apparatus of claim 1 wherein said drive means is configured in such a manner that said fluid coupling means are disabled with regard to transmitting power when said clutch is engaged.

7. An apparatus having a prime mover selectively couplable through drive means to a driven device with said drive means comprising:

a) an input shaft and an output shaft journaled for rotation about a common axis of rotation, said input shaft being operably coupled to said prime mover for receipt of input power therefrom, said output shaft being operably coupled to said driven device for delivery of output power thereto;

b) clutch means for selectively establishing operative connection between said input and output shafts such that when said clutch means is in an engaged position said input power from said prime mover is transmitted to said driven device by said clutch means to rotate said driven device at a rated speed thereof, and when said clutch means is in a dis-engaged position said prime mover does not transmit said input power to said driven device through said clutch means;

c) a hydraulic control circuit for selectively engaging and dis-engaging said clutch, said hydraulic control circuit defining a control volume of fluid therein, and d) fluid coupling means having impeller means attached to said input shaft and turbine means attached to said output shaft, said fluid coupling being disposed in fluid communication with said control volume of fluid in such a manner that with said clutch in said disengaged position said fluid coupling converts a majority of said input power into heating of said fluid in said control volume, and transmits a minority of said input power to said output shaft to cause rotation of said driven device at a speed significantly below said rated speed thereof.

8. The apparatus of claim 7 wherein:

a) said clutch means includes:
      a series of interleaved annular shaped drive plates and driven plates;
      said drive plates being attached to said input shaft in a manner to be slideable axially upon but constrained to rotate with said input shaft;
      said driven plates being attached to said output shaft in a manner to be slidable axially upon but constrained to rotate with said output shaft;
      said input shaft including at one axial end thereof adjacent said input shaft a radially extending integral flange; a piston for clamping said interleaved drive and driven plates against one
      another and against said flange to engage said clutch.

\* \* \* \* \*